(12) United States Patent
Delvo

(10) Patent No.: US 7,451,832 B1
(45) Date of Patent: Nov. 18, 2008

(54) WEED REMOVER TOOL ATTACHMENT

(76) Inventor: Douglas W. Delvo, P.O. Box 672, Beulah, ND (US) 58523

( * ) Notice: Subject to any disclaimer, the term of this patent is extended or adjusted under 35 U.S.C. 154(b) by 276 days.

(21) Appl. No.: 11/332,591

(22) Filed: Jan. 12, 2006

(51) Int. Cl.
*A01B 13/00* (2006.01)

(52) U.S. Cl. .......................... 172/25; 172/41; 172/378; 30/276

(58) Field of Classification Search ............... 30/276; 172/41, 122, 123, 13–18, 25, 111, 378; 56/12.7, 56/12.8, 13.4; 366/342, 343, 205, 206; 241/281.1, 241/281.2
See application file for complete search history.

(56) References Cited

U.S. PATENT DOCUMENTS

| | | | |
|---|---|---|---|
| 3,273,930 A * | 9/1966 | Gottfried | ................... 111/101 |
| 3,851,390 A | 12/1974 | Neal | |
| 4,072,195 A | 2/1978 | Carlson | |
| 4,501,332 A | 2/1985 | Straayer | |
| 5,005,653 A | 4/1991 | Macomber | |
| 5,426,852 A | 6/1995 | Macomber | |
| 5,491,963 A | 2/1996 | Jerez | |
| 5,730,225 A | 3/1998 | Fults | |
| 6,006,434 A | 12/1999 | Templeton et al. | |
| 6,119,787 A | 9/2000 | Garcia | |
| 6,189,627 B1 | 2/2001 | Marshall et al. | |
| 6,293,350 B1 | 9/2001 | Paolo | |
| 6,349,475 B1 * | 2/2002 | Buck | ........................... 30/276 |
| 6,681,865 B2 | 1/2004 | Pace | |
| 6,810,967 B1 * | 11/2004 | Phillips | ....................... 172/13 |
| 6,904,976 B1 | 6/2005 | Zach et al. | |
| 2001/0000881 A1 | 5/2001 | Marshall et al. | |
| 2003/0230418 A1 | 12/2003 | Pace | |

FOREIGN PATENT DOCUMENTS

| | | |
|---|---|---|
| DE | 3641263 | 3/1987 |
| GB | 2118811 | 11/1983 |
| WO | WO97/49275 | 12/1997 |

* cited by examiner

*Primary Examiner*—Kenneth E. Peterson
*Assistant Examiner*—Phong Nguyen

(57) ABSTRACT

A weed remover tool attachment for efficiently removing undesirable plants. The weed remover tool attachment includes a connecting member including a connecting aperture, wherein the connecting aperture is formed to receive a shaft of a weed trimmer, a first blade extending from the connecting member and a second blade extending from the connecting member.

2 Claims, 8 Drawing Sheets

WEED REMOVER TOOL ATTACHMENT

DESCRIPTION OF THE RELATED ART

Any discussion of the prior art throughout the specification should in no way be considered as an admission that such prior art is widely known or forms part of common general knowledge in the field.

Gardening tools have been in use for years. Typically, removing weeds and unwanted grass from and around plants is done manually with the use of a hoe, spade, or other device. When using a hoe, a pulling and digging operation is performed in order to break up the ground so weeds and unwanted grass may be removed. When using a spade, typically a person digs around the area that needs removal in order to rid the area of weeds and unwanted grass. Weeds and unwanted grass may also be removed from and around plants by manually pulling them out with one's hand. A power tiller may also be used to break up ground and remove unwanted weeds and grass.

Removing weeds and unwanted grass from unwanted areas using manual labor proves to be a tedious and tiring process. Often a person must bend over to pull out weeds when gardening, which may be stressful for their back. Using manual tools, also, often requires a person to get down on their hands and knees exposing themselves to dirty areas.

Using a power tiller to remove weeds, unwanted grass and shallow roots is difficult or impossible around plants. Because of the structure of the power tiller, it is nearly impossible to precisely break up ground in order to remove undesirable plants from narrowly confined areas.

While these devices may be suitable for the particular purpose to which they address, they are not as suitable for efficiently removing undesirable plants. Manually removing weeds, unwanted grass and shallow roots, by the use of a spade, hoe, hand or other device, between and around plants causes excessive tiring of a person. This happens because of the steady and tedious nature of these activities.

Using a power tiller to remove undesirable plants brings a very likely risk of damaging wanted plants because of the inaccuracy of the power tiller. Because of the tiller's size, it is also difficult to maneuver, again causing excessive tiring.

In these respects, the weed remover tool attachment according to the present invention substantially departs from the conventional concepts and designs of the prior art, and in so doing, provides an apparatus primarily developed for the purpose of efficiently removing undesirable plants.

BRIEF SUMMARY OF THE INVENTION

In view of the foregoing disadvantages inherent in the known types of gardening tools now present in the prior art, the present invention provides a new weed remover tool attachment construction wherein the same can be utilized for efficiently removing undesirable plants.

The general purpose of the present invention, which will be described subsequently in greater detail, is to provide a new weed remover tool attachment that has many of the advantages of the gardening tools mentioned heretofore and many novel features that result in a new weed remover tool attachment which is not anticipated, rendered obvious, suggested, or even implied by any of the prior art gardening tools, either alone or in any combination thereof.

To attain this, the present invention generally comprises a connecting member including a connecting aperture, wherein the connecting aperture is formed to receive a shaft of a weed trimmer, a first blade extending from the connecting member and a second blade extending from the connecting member.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a weed remover tool attachment that will overcome the shortcomings of the prior art devices.

A second object is to provide a weed remover tool attachment for efficiently removing undesirable plants.

Another object is to provide a weed remover tool attachment that allows a user to rid ground of weeds, unwanted grass and shallow roots without bending over.

An additional object is to provide a weed remover tool attachment that is easily attachable to various types of weed trimmers.

A further object is to provide a weed remover tool attachment that may be driven into the ground to remove roots of grass and unwanted weeds.

Another object is to provide a weed remover tool attachment that may be used continuously without becoming clogged with dirt and other ground substances.

Another object is to provide a weed remover tool attachment that cuts easily into the ground providing quick removal of undesirable plants.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
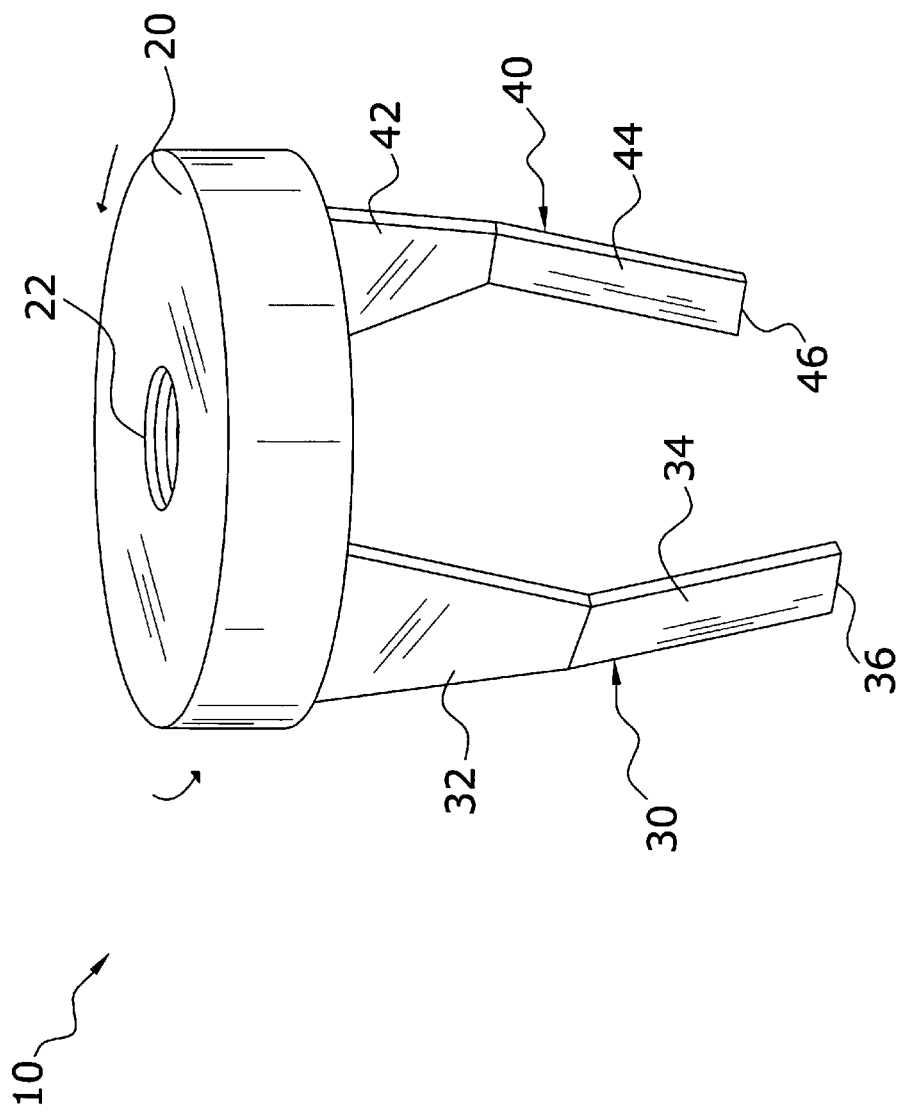
FIG. 1 is an upper perspective view of the present invention.

Turning now descriptively to the drawings, in which similar reference characters denote similar elements throughout the several views, FIGS. 1 through 8 illustrate a weed remover tool attachment 10, which comprises a connecting member including a connecting aperture 22, wherein the connecting aperture 22 is formed to receive a shaft 14 of a weed trimmer 12, a first blade 30 extending from the connecting member 20 and a second blade 40 extending from the connecting member 20.

B. Connecting Member

Figure 5:
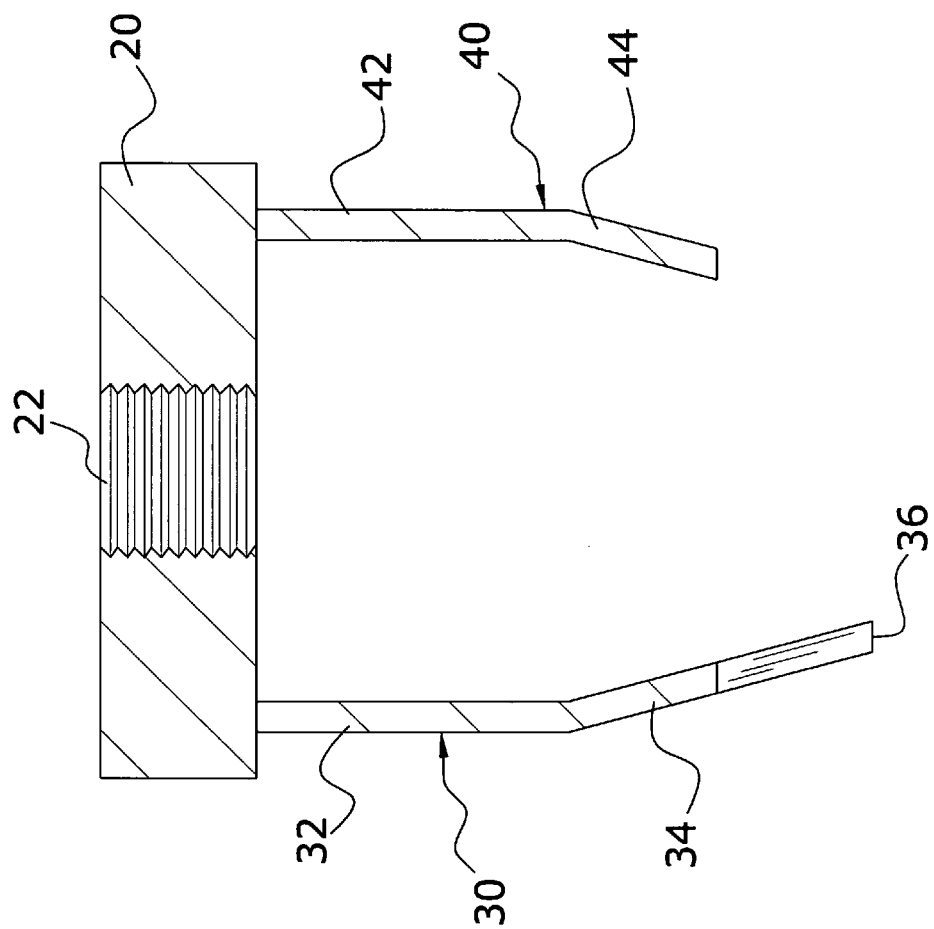
FIG. 5 is a cross sectional view taken along line 5-5 of FIG. 4.
Figure 6:
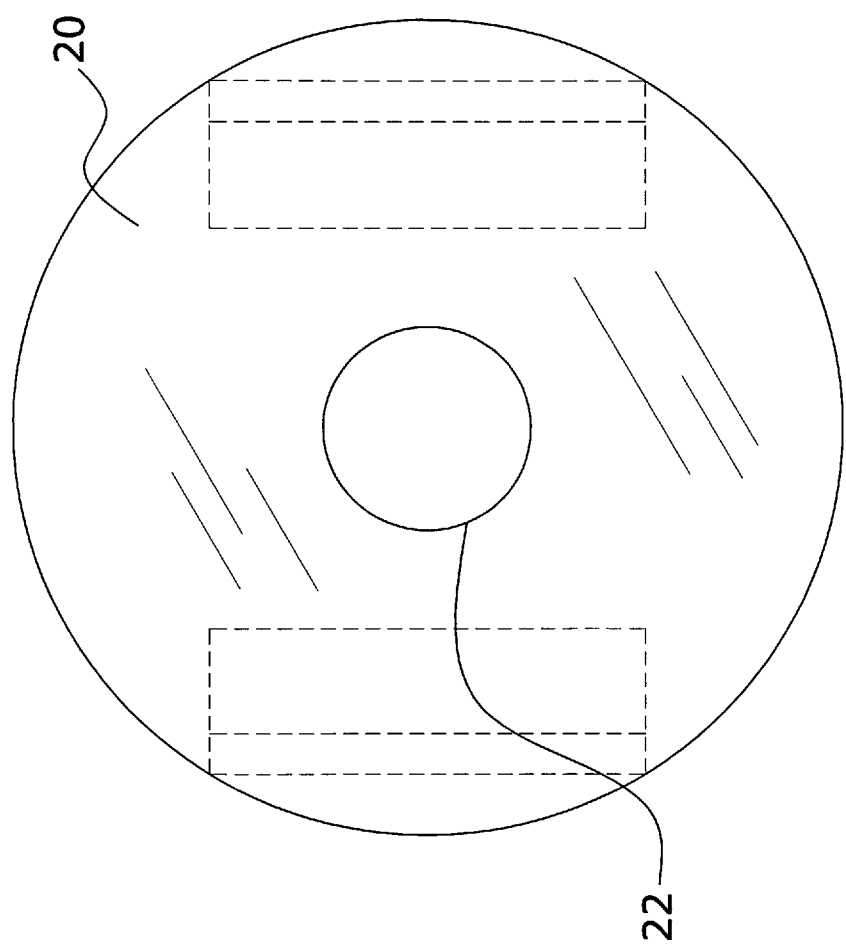
FIG. 6 is a top view of the present invention.

The connecting member 20 is comprised of a structure and configuration that is suitable for attaching to a shaft 14 of a weed trimmer 12. The connecting member 20 is preferably a plate structure, as shown in FIGS. 1 through 8. The connecting member 20 includes a connecting aperture 22, as best shown in FIGS. 1, 5 and 6. The connecting aperture 22 is preferably in the concentric origin of the connecting member 20 as to allow greater controllability of the weed remover tool attachment 10 during use.

Figure 7:
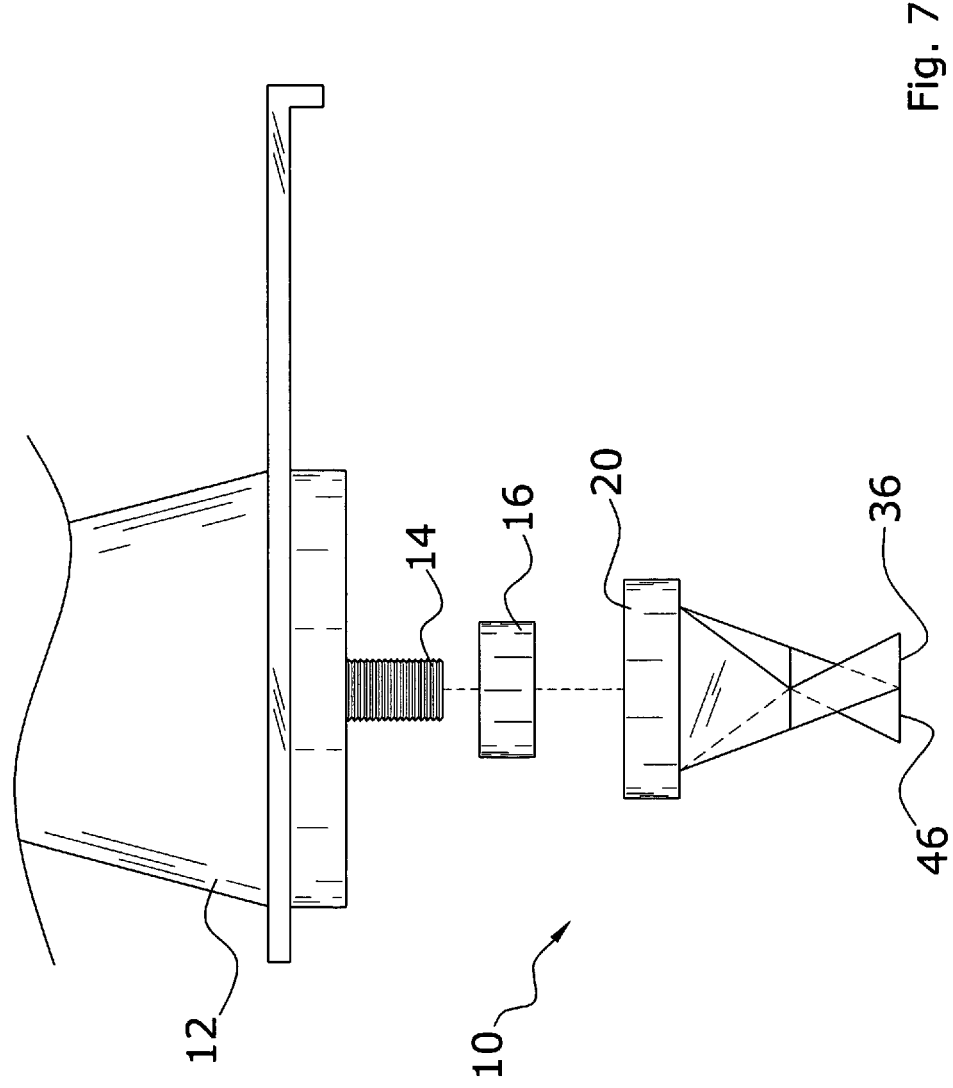
FIG. 7 is an exploded side view of the present invention attaching to a weed trimmer.
Figure 8:
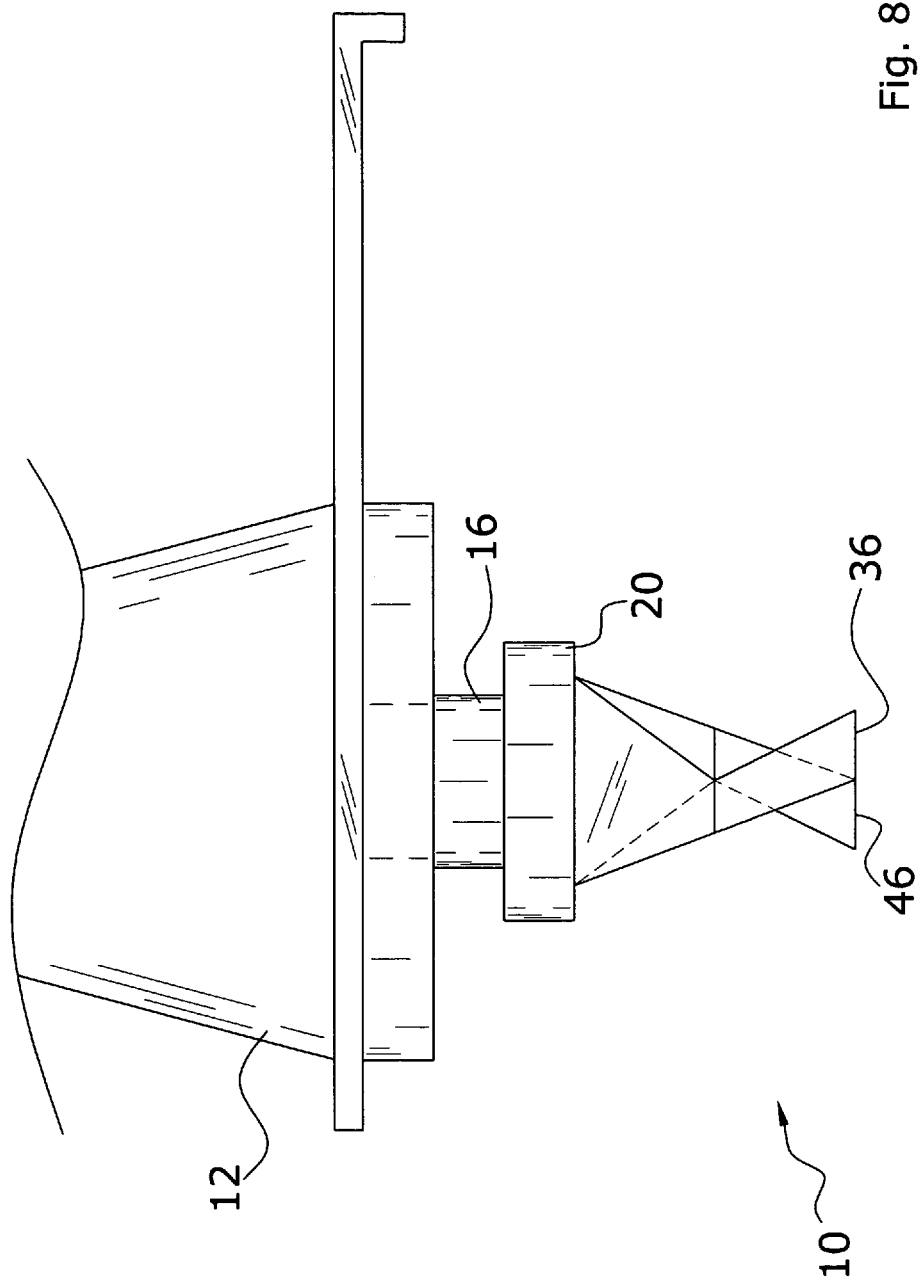
FIG. 8 is a side view of the present invention attached to a weed trimmer.

Preferably, the connecting aperture 22 is formed to receive a shaft 14 of a weed trimmer 12 by being threadably connectable, as best shown in FIGS. 7 and 8. The connecting aperture 22 is preferably threadably connectable in a counterclockwise manner to a shaft 14 of a weed trimmer 12, as viewed from a shaft 14 of a weed trimmer 12 to the connecting member 20.

As the shaft 14 of a weed trimmer 12 is rotated in a counterclockwise manner, as viewed from a shaft 14 of a weed trimmer 12 to the connecting member 20, the connecting member 20 is also rotated in a similar manner. This prevents loosening of the weed remover tool attachment 10 during use.

C. Blades

The blades are comprised of a structure and configuration that is suitable for breaking up dirt and other ground substances in order to remove undesirable plants (e.g. weeds, grass, shallow roots). The weed remover tool attachment 10 preferably has at least two blades in order to best break up dirt and other ground substances.

Figure 2:
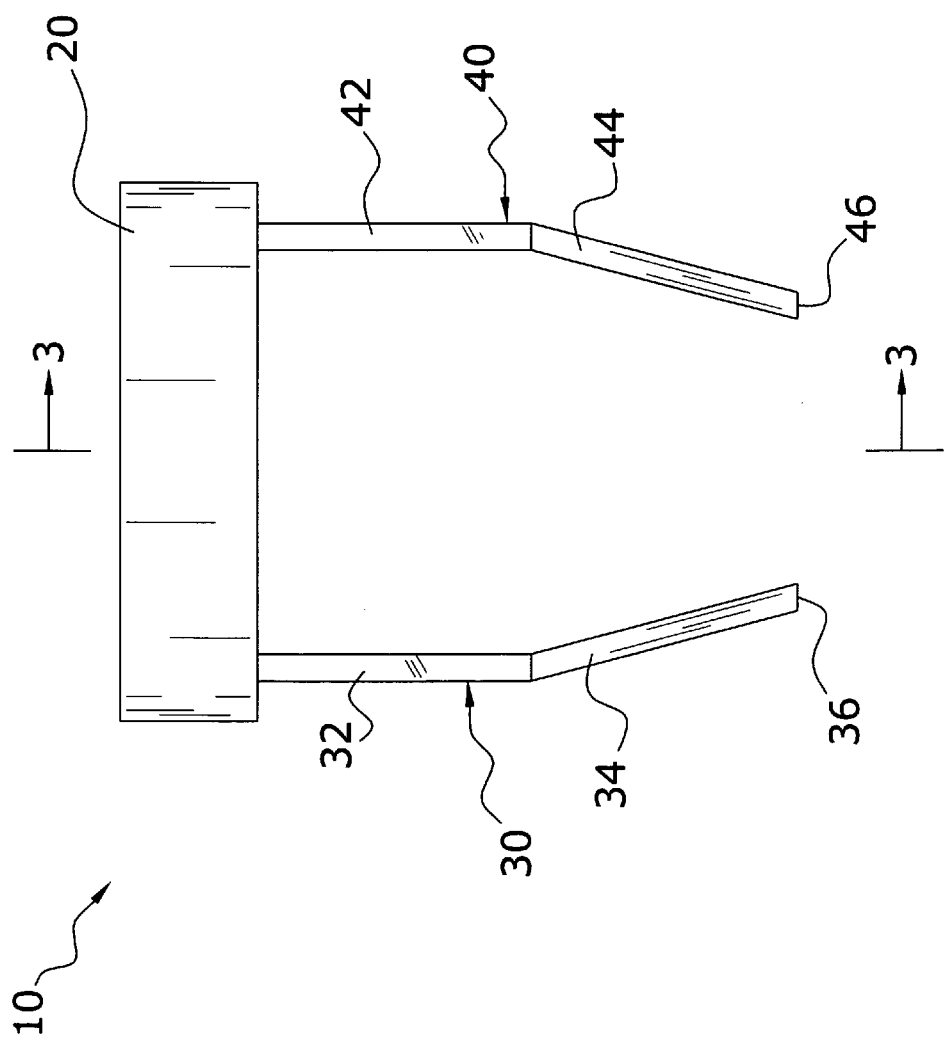
FIG. 2 is a front view of the present invention.

The first blade 30 and the second blade 40 extend from the connecting member 20, as best shown in FIGS. 1 and 2. The first blade 30 and the second blade 40 extend from opposite sides of the connecting member 20, as to provide maximum control during use. To further increase control, the first blade 30 and the second blade 40 are preferably of a structure to mirror one another when attached to the connecting member 20.

The first blade 30 and the second blade 40 include a first upper portion 32 and second upper portion 42 which extends from the connecting member 20. As best shown in FIGS. 1 and 2, preferably the first blade 30 and the second blade 40 also respectively include a first lower portion 34 and a second lower portion. Preferably, the first lower portion 34 and the second lower portion 44 extend inwardly at an angle from the first upper portion 32 and the second upper portion 42, respectively. The angle formed by the first upper portion 32 and the first lower portion 34, along with the angle formed by the second upper portion 42 and the second lower portion 44, is preferably less than 30 degrees. This keeps the first blade 30 and the second blade 40 substantially parallel to a concentric axis extending through the connecting member 20. To increase strength and durability, the first upper portion 32 and the second upper portion 42, preferably, has a greater width than the first lower portion 34 and the second lower portion 44.

Figure 4:
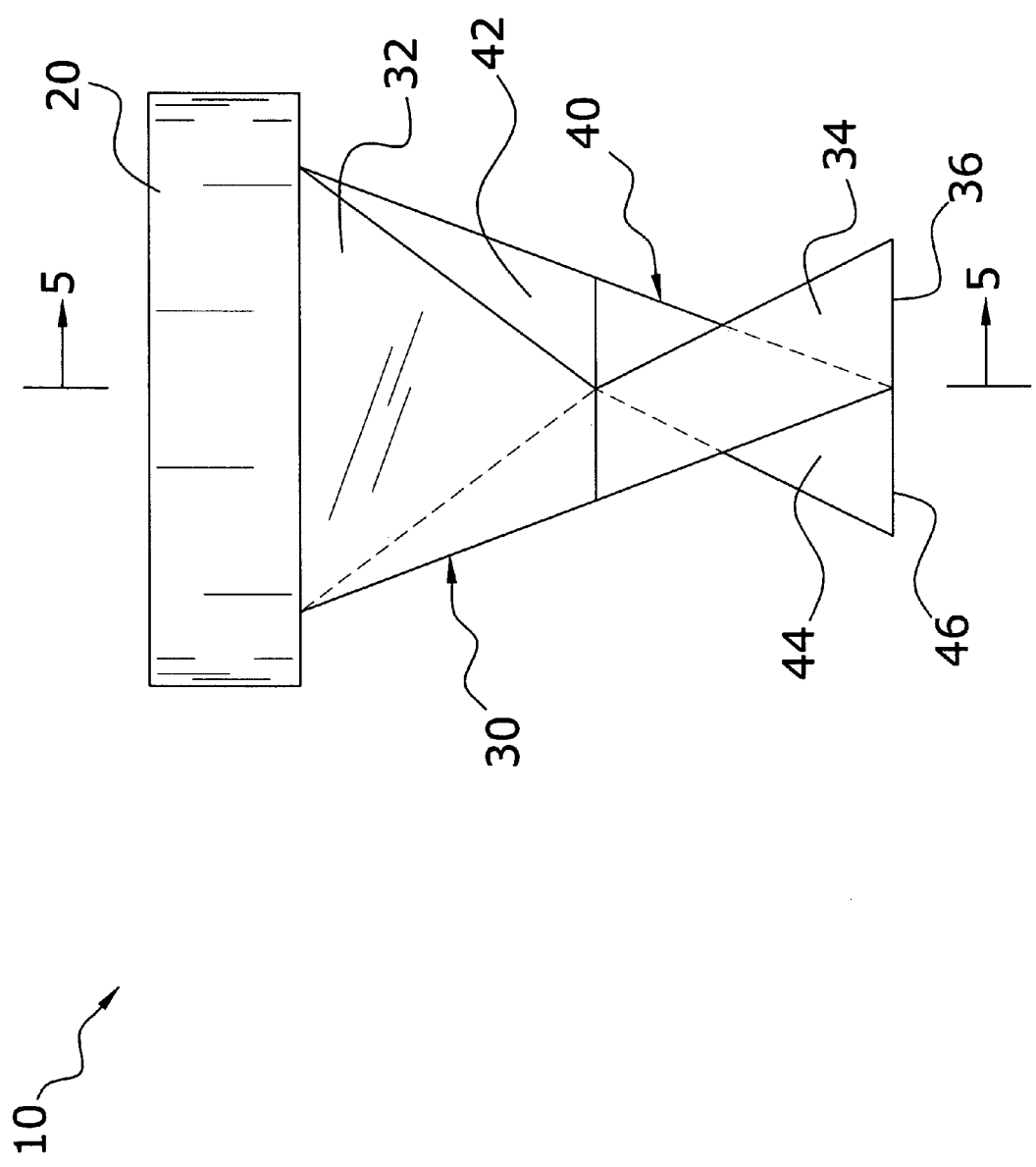
FIG. 4 is a side view of the present invention.

As best shown in FIGS. 1 and 4, the first blade 30 and the second blade 40 preferably extend in a clockwise direction to increase digging efficiency, as viewed from a shaft 14 of a weed trimmer 12 to the connecting member 20. The indentation formed from the first blade 30 and second blade 40 extending in a counterclockwise direction helps to keep the weed remover tool attachment 10 free of dirt and other ground substances during use.

Figure 3:
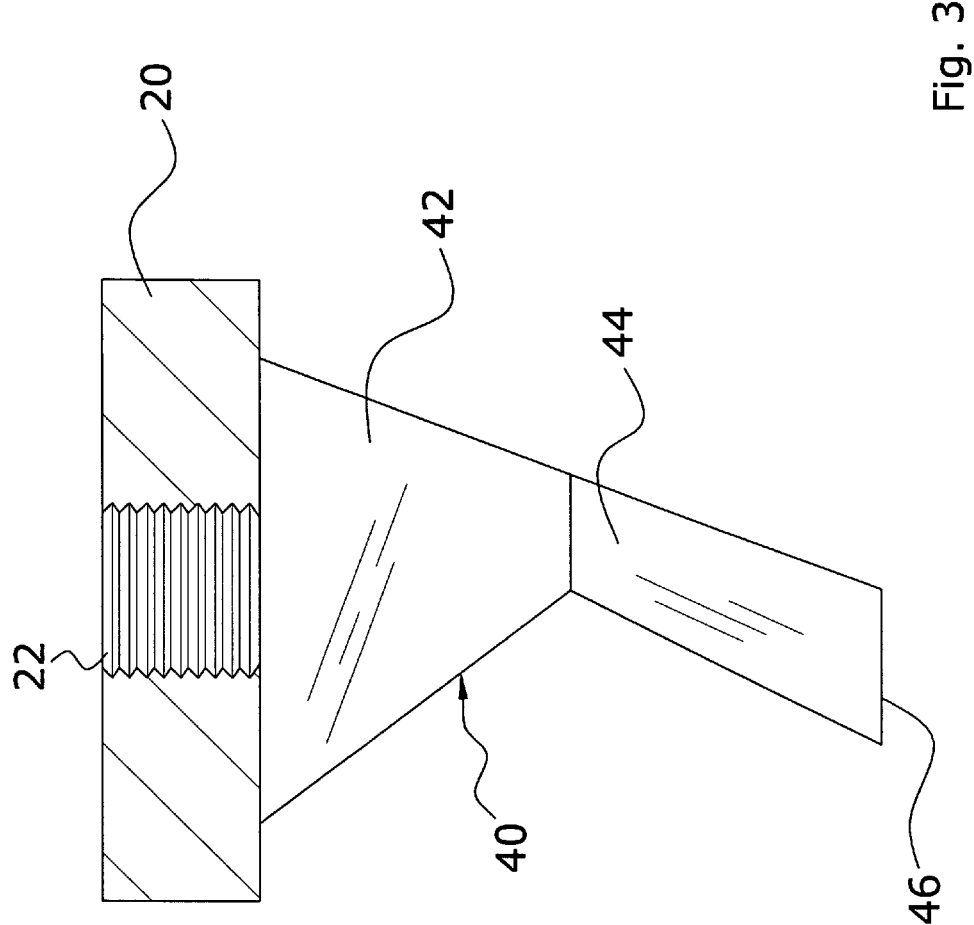
FIG. 3 is a cross sectional view taken along line 3-3 of FIG. 2.

The first blade 30 and the second blade 40 also preferably include a first end 36 and a second end 46. The first end 36 and the second end 46 are preferably substantially parallel to the connecting member 20, as best shown in FIGS. 2 through 4. The distance from the first end 36 to the connecting member 20 is preferably substantially equal to the distance from the second end 46 to the connecting member 20, as best shown in FIGS. 2 through 4.

D. Operation of Invention

To attach the present invention to the shaft 14, the current trimming device must be first removed from the weed trimmer 12. The weed remover tool attachment may be screwed into the shaft 14 via the connecting aperture 22 in a counterclockwise manner, as viewed from a shaft 14 of a weed trimmer 12 to the connecting member 20. While attaching the weed remover tool attachment 10 to the weed trimmer 12, the first end 36 and the second end 46 are directed away from the weed trimmer 12.

If the depth of the connecting member 20 is substantially less than the height of the exposed shaft 14, a spacer 16 may be placed over the shaft 14. As shown in FIGS. 7 and 8, the spacer 16 is placed in between the weed trimmer 12 and the connecting member 20 to keep the shaft 14 free of dirt and other ground substances. Once the weed remover tool attachment 10 is tightly secure on the shaft 14, the weed trimmer 12 and weed remover tool attachment 10 is now ready for use.

In use, the weed trimmer 12 is started up and the weed remover tool attachment 10 is directed directly above the undesirable plants. The weed trimmer 12 speed is adjusted until a desirable speed is reached. The weed remover tool attachment 10 is now placed directly on the undesirable plants and directed into the ground until the undesirable plants are removed.

Once the undesirable plants have been removed, the weed trimmer 12 may be turned off. If it is desired that the weed remover tool attachment 10 be removed (e.g. sharpening of the blades, etc.) from the weed trimmer 12, the connecting member 20 is rotated in a clockwise manner, as viewed from a shaft 14 of a weed trimmer 12 to the connecting member 20.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A weed remover tool attachment, comprising:
a connecting member including a connecting aperture, wherein said connecting aperture extends through said connecting member;
wherein said connecting aperture is threadably formed;
a first blade extending from said connecting member;
wherein said first blade includes a first upper portion and a first lower portion extending from said first upper portion;
wherein said first upper portion is comprised of a trapezoidal configuration;
wherein said first upper portion extends from said connecting member in a straight and downward manner;
wherein said first upper portion is parallel to a center axis of said connecting aperture;
wherein said first lower portion extends inwardly from said first upper portion towards said center axis;
wherein said first lower portion is comprised of a trapezoidal configuration;
a first indentation formed between said first upper portion and said second upper portion, wherein said first indentation is comprised of a V-shaped configuration;
a second blade extending from said connecting member, wherein said second blade extends from an opposing side of said connecting member as said first blade;
wherein said second blade includes a second upper portion and a second lower portion extending from said second upper portion;
wherein said second upper portion is comprised of a trapezoidal configuration;
wherein said second upper portion extends from said connecting member in a straight and downward manner;
wherein said second upper portion is parallel to a center axis of said connecting aperture;
wherein said second lower portion extends inwardly from said second upper portion towards said center axis;
wherein said second lower portion is comprised of a trapezoidal configuration; and
a second indentation formed between said second upper portion and said second lower portion, wherein said second indentation is comprised of a V-shaped configuration.

2. The weed remover tool attachment of claim 1, wherein said connecting member attaches to a shaft of a weed trimmer via said connecting aperture.

* * * * *